WILLIAM HALL.
Improvement in Rotary Engines.

No. 123,695. Patented Feb. 13, 1872.

Witnesses,
L. Hailer
Phil. T. Dodge

Inventor,
Wm. Hall
by Dodge & Munn
Attys

123,695

UNITED STATES PATENT OFFICE.

WILLIAM HALL, OF TURNEY STATION, MISSOURI.

IMPROVEMENT IN ROTARY ENGINES.

Specification forming part of Letters Patent No. 123,695, dated February 13, 1872.

SPECIFICATION.
*To all whom it may concern:*

Be it known that I, WILLIAM HALL, of Turney Station, in the county of Clinton and State of Missouri, have invented certain Improvements in Rotary Steam-Engines, of which the following is a specification, reference being had to the accompanying drawing.

My invention consists in a novel construction and combination of parts, whereby I produce a simple and economical engine, and one which can be run in either direction at will, as hereinafter described.

Figure 1:
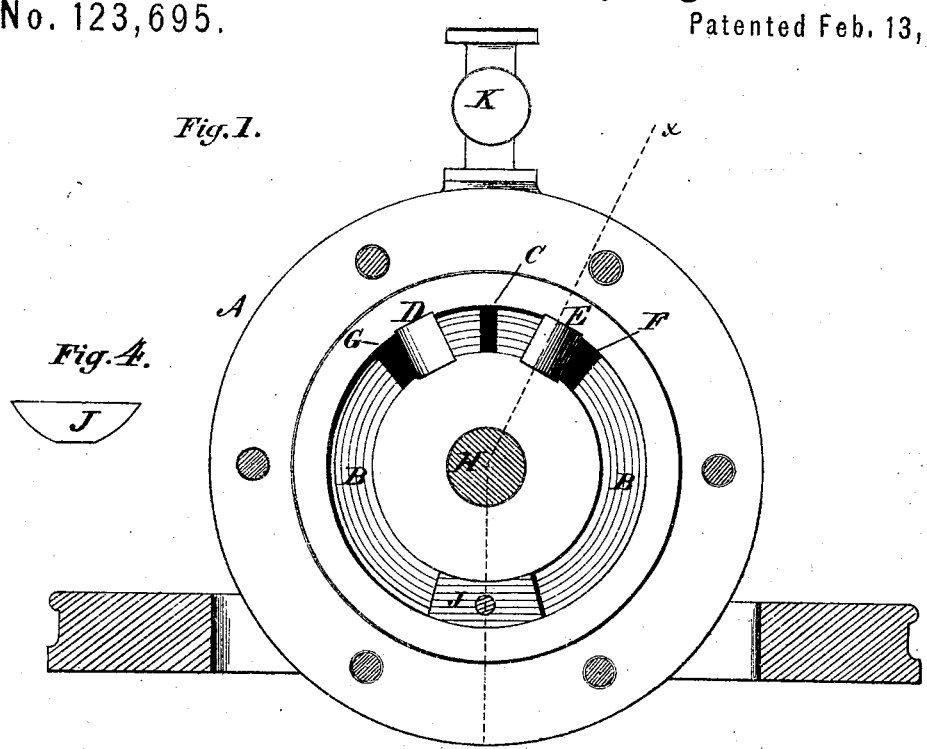
Figure 3:
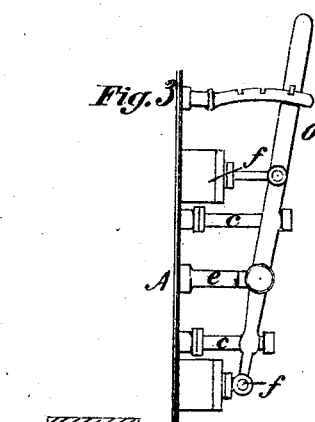
Figure 2:
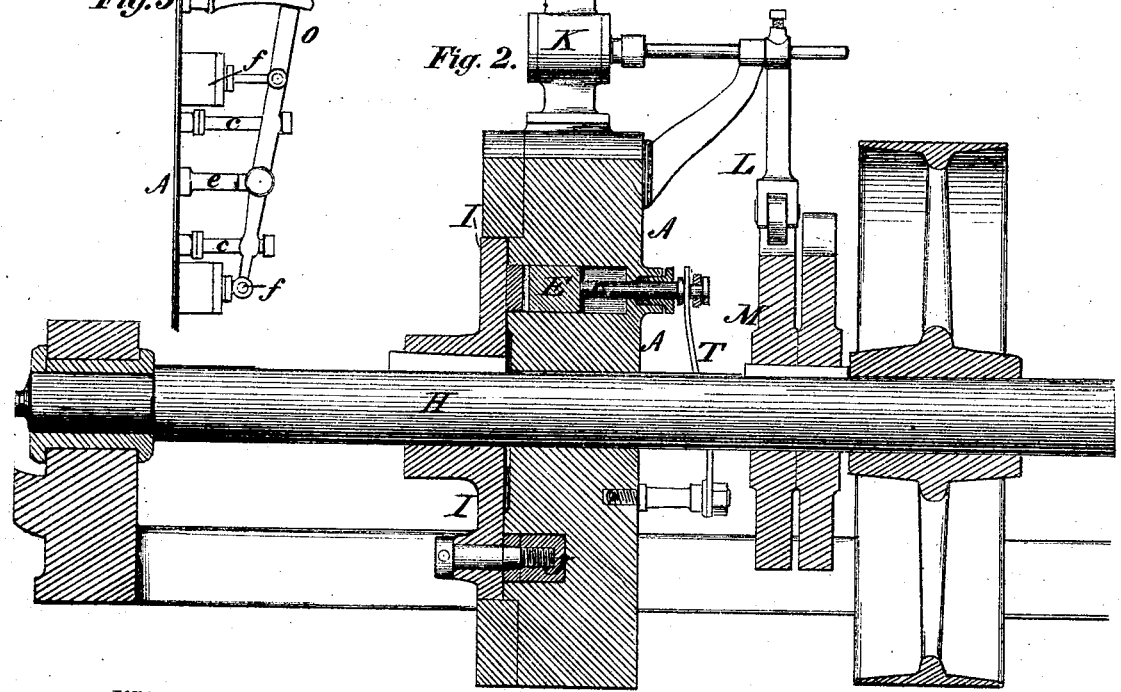

Figure 1 is a section of my engine on the line y y of Fig. 2. Fig. 2 is a section of the engine on the line x x of Fig 1. Fig. 3 is a view, showing the arrangement of valves for reversing the motion of the engine, and Fig. 4 an edge view of the piston.

Figure 4:

In constructing my engine I first provide a round body or case, A, and mount it rigidly on a suitable base or frame, as shown. In the side or face of the body I form a circular groove or passage, B, to receive the piston, and through its center make a hole to admit the main-shaft. The main-shaft H is passed loosely through the central hole of body A, and has its ends mounted in suitable bearings on the base or frame; and it has secured upon it a disk, I, which fits against the face of the body A, and closes the otherwise open side of the channel B. To the inner side of the disk I, I secure the piston or slide J, fitting closely into the channel B, as shown in Figs. 1 and 2, so that it can slide freely around therein, and thereby turn the disk I and its shaft H. The face of the disk I and that of the body A, I fit closely together so that no steam can escape from the channel B out between them, while at the same time the disk is allowed to turn freely as the piston or slide urges it around. In the upper part of the body A I form a port, C, for the admission of steam to the channel or chamber B, and on opposite sides of said port I form two exhaust-ports, F and G. Between the exhaust-ports and the induction-port I mount sliding valves or abutments D and E, one on each side of the induction-port, as shown. Each valve or abutment is provided with a stem, c, extending out through the side of the body, and to the outer ends of said stems springs T are applied, as shown in Fig. 2, so as to keep the valves forced inward across the channel B. The valve D has its inner end beveled off to the left, and the valve E its end beveled to the right, as shown in Fig. 1, while the piston J has both of its ends beveled, as shown in Fig. 4, so that upon being turned around to the right the piston will force back the valve D and pass by it, or upon being turned to the left it will force back and pass the valve E, the valves being in each instance forced inward by their springs as soon as the piston passes them. When it is desired to have the engine run toward the right, the valve F is drawn back and fastened and the port F closed, and steam then admitted through port C, the valve D being of course held down by its spring so as to form a partition or abutment across the channel B. The steam forces the piston around in the channel B with such velocity that it opens and passes the valve D and passes on by the port C. The opening of valve D of course equalizes the pressure on both sides of the piston so that it is carried from the valve past port C by momentum only; but, as the valve closes immediately behind the piston, the steam again commences to act as soon as the piston passes port C. By placing the valve D and the port C close together, and making the piston correspondingly short, the steam may be caused to act during all but a fraction of the revolution. As the piston travels around the steam remaining in the channel from the previous revolution passes forward before the piston and escapes through the port G. When it is desired to have the engine revolve to the left, the valve E is released so as to spring into its seat and the port F opened, and then the valve D fastened back and port G closed. Upon steam being admitted the piston will be carried around to the left so as to open and pass valve E, and the steam allowed to escape through port F, the operation being the same as when running to the right, except that the valve and port used are in reverse positions. When it is desired to use the steam expansively, I apply to the steam supply-pipe K a throttle-valve, and to the stem of such valve attach a depending arm, L, and also provide the main-shaft H with an eccentric or cam M to operate the arm L and cut off the steam at the proper times. Two of the eccentrics should be provided, as shown, one to be used when the engine runs to the right, and the other when it runs to the left, the arm being made adjustable on the valve-stem so as to be operated by one or the other of the eccentrics. The manner of opening and closing the respective exhaust-ports and of holding back the valve for reversing the motion of the engine, is clearly shown in Fig. 1. The stems $c$ of the valves D and E are slotted and mounted on opposite ends of a lever, O, which is pivoted to a stud, $e$, on the body A, so that when the lever is moved it holds back one valve, but leaves the other free to slide in and out. To the opposite ends of the lever there are also connected valves $f$ for closing the exhaust-ports F and G. The parts are so arranged that when one end of the lever is drawn back one port is closed, and the adjoining valve held back, while, by drawing back the opposite end of the lever, the opposite port is closed and the other valve held back, so that the engine will run in the opposite direction. It is obvious that the joint between the disk I and the body, may be provided with metal or elastic packing-rings to prevent leakage, and also that a set-screw may be arranged against the end of the shaft H, so as to move the same endwise and force the disk B up against the body as they wear away.

Having thus described my invention, what I claim is—

In a rotary engine, the combination of the two beveled-faced valves D and E, and a piston-head J, beveled at each end, when constructed and arranged to operate substantially as herein described, for the purpose of driving the engine in either direction as set forth.

WILLIAM HALL.

Witnesses:
H. B. MUNN,
J. McKENNEY.